(12) United States Patent
Haeberer et al.

(10) Patent No.: US 8,371,107 B2
(45) Date of Patent: Feb. 12, 2013

(54) DEVICE FOR REGENERATION, TEMPERATURE LOADING, AND/OR THERMAL MANAGEMENT, ASSOCIATED INJECTION VALVE, AND METHOD

(75) Inventors: Rainer Haeberer, Bretten (DE); Joerg Lange, Eberdingen (DE); Volker Reusing, Stuttgart (DE); Tobias Reiser, Ehningen (DE); Stefan Stein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 12/301,398

(22) PCT Filed: Apr. 23, 2007

(86) PCT No.: PCT/EP2007/053936
§ 371 (c)(1),
(2), (4) Date: Nov. 18, 2008

(87) PCT Pub. No.: WO2007/134929
PCT Pub. Date: Nov. 29, 2007

(65) Prior Publication Data
US 2009/0255234 A1      Oct. 15, 2009

(30) Foreign Application Priority Data

May 23, 2006   (DE) .................. 10 2006 024 073
Dec. 6, 2006   (DE) .................. 10 2006 057 425

(51) Int. Cl.
*F01N 3/00* (2006.01)

(52) U.S. Cl. .................. 60/286; 239/533.4; 239/533.11

(58) Field of Classification Search .................. 60/286; 239/533.11, 533.3, 533.4, 533.7, 585.1; 251/333, 251/359
See application file for complete search history.

(56) References Cited

U.S. PATENT DOCUMENTS 5,806,310 A *  9/1998  Daidou et al. .................. 60/286
6,168,132 B1 *  1/2001  Frank et al. ..................... 251/33
6,173,912 B1 *  1/2001  Gottlieb et al. .......... 239/533.12
(Continued)

FOREIGN PATENT DOCUMENTS

DE      102004034075 A1     2/2006
(Continued)

*Primary Examiner* — Thomas Denion
*Assistant Examiner* — Matthew T Largi
(74) *Attorney, Agent, or Firm* — Michael Best & Friedrich LLP

(57) ABSTRACT

The invention relates to a device for the regeneration, temperature loading and/or thermal management of a component, assigned to an exhaust system, of an internal combustion engine. The device includes at least one injection valve which injects a fluid, in particular fuel, into the exhaust system, preferably in chatter mode, for example as a function of the pressure of the supplied fluid. The injection valve has a valve head and a valve seat which have geometries designed in such a way that a fluidic force of the supplied fluid acting on the injection valve drops continuously over a stroke of the valve head. The invention also relates to an injection valve having such valve-head and valve-seat geometries and to a corresponding method for the regeneration, temperature loading and/or thermal management of a component, assigned to an exhaust system, of an internal combustion engine.

18 Claims, 8 Drawing Sheets

U.S. PATENT DOCUMENTS

| | | | |
|---|---|---|---|
| 6,755,360 B1 * | 6/2004 | Anderson et al. | 239/585.1 |
| 7,044,407 B2 * | 5/2006 | Fischer et al. | 239/533.7 |
| 2005/0150978 A1 * | 7/2005 | Kaden et al. | 239/453 |
| 2005/0247048 A1 * | 11/2005 | Schaller et al. | 60/286 |
| 2006/0108452 A1 * | 5/2006 | Anzinger et al. | 239/533.7 |
| 2006/0255185 A1 * | 11/2006 | Cristiani et al. | 239/533.7 |

FOREIGN PATENT DOCUMENTS

| | | |
|---|---|---|
| EP | 1655482 A1 | 5/2006 |
| WO | 0243840 A1 | 6/2002 |
| WO | 2007012512 A1 | 2/2007 |

\* cited by examiner time time frequency

DEVICE FOR REGENERATION, TEMPERATURE LOADING, AND/OR THERMAL MANAGEMENT, ASSOCIATED INJECTION VALVE, AND METHOD

CROSS-REFERENCE TO RELATED APPLICATION

This application is a 35 USC 371 application of PCT/EP 2007/053936 filed on Apr. 23, 2007.

BACKGROUND OF THE INVENTION

1. Field of the Invention

The invention relates to a device for regeneration, temperature loading, and/or thermal management of an exhaust system-associated component of an internal combustion engine, an injection valve for use in such a device, and a method for regeneration, temperature loading, and/or thermal management of an exhaust system-associated component.

2. Description of the Prior Art

It is known to install a particulate filter in an exhaust system of an internal combustion engine of a vehicle. If the internal combustion engine is a diesel engine, for example, then the particulate filter functions as a soot filter, for example, and its filtering action reduces the output of fine particulate matter. In order to prevent the filter from becoming clogged after a certain amount of use, it is necessary to regenerate the filter from time to time. The regeneration is produced by increasing the temperature, for example to approximately 600° Celsius, which triggers combustion of the particulate matter, especially soot particles. Since it is not possible in all operating states to achieve this through steps taken with the engine, the temperature increase is produced by means of fuel, for example diesel, which is injected into the exhaust line via an injection valve.

The injected fuel travels to an oxidizing converter that is situated upstream of the particulate filter. The fuel traveling into the oxidizing converter is oxidized and burned. thus increasing the exhaust temperature so that correspondingly hot exhaust travels into the downstream particulate filter and causes the regeneration to occur in it.

Conventional multiport and single-port injection valves can be used to meter fuel into the exhaust. However, these have the disadvantage that the ports become clogged or coked with residues of soot contained in the exhaust under the existing operating conditions. As a result, the metering quantity decreases over the operating duration; under some circumstances, this results in the fact that the injected quantity is no longer sufficient for the regeneration of the particulate filter or in the worst-case scenario, can no longer be metered at all.

It is also possible to use an injection valve that operates as a function of the pressure of the supplied fuel, i.e. if the pressure of the supplied fuel exceeds a certain predetermined value, then the injection valve opens and injects a fuel quantity into the exhaust system. This reduces the pressure in the supply system so that the injection valve closes again. Then, the pressure increases again so that the injection valve opens again and fuel is injected into the exhaust system. As a result, the injection valve opens and closes rhythmically, which results in a so-called chattering operation. Such a chattering operation is known from the "Bosch Automotive Handbook, 6$^{th}$ Edition," Robert Bosch GmbH, 2004, ISBN 0-8376-1243-8, page 645. In addition, the occurrence of a chattering operation in a device for exhaust treatment of an internal combustion engine is described in the German patent application DE 102005034704. Since the supply of fuel to the injection valve is not produced with a constant pressure due to the involved components, but is instead accompanied by pressure fluctuations and possibly also short-term pressure peaks, a stoppage of the chattering operation may occur.

ADVANTAGES AND SUMMARY OF THE INVENTION

The device according to the invention for regeneration, temperature loading. and/or thermal management of an exhaust system-associated component of an internal combustion engine, the injection valve according to the invention, and the method according to the invention, with the defining characteristics of the independent claims, have the advantage over the prior art that a flow force of a supplied fuel acting on the injection valve included in the device decreases continuously over a stroke of the valve head and the geometries of a valve head and valve seat of the injection valve are embodied in a corresponding fashion. As a result, the pressure range for a robust chattering behavior is extended, thus advantageously making it possible to achieve a good fuel spray preparation in the. exhaust line and a more reliable protection from excessive coking.

It is particularly advantageous for an outer head diameter of the valve head to be larger than an outer seat diameter of the valve seat, as a result of which in the closed position, the valve head juts out over the valve seat and a valve sealing edge is situated at the outer seat diameter. The valve seat has a straight valve seat cut edge that has a predetermined angle cc in relation to the vertical and is situated, for example, between an inner seat diameter and the outer seat diameter.

In one embodiment of the device and valve according to the invention, a valve head cut edge of the valve head expands from an inner head diameter to the outer head diameter with a flattened ball-shaped external curvature, which has a predetermined valve head radius.

In another embodiment of the device according to the invention for regeneration, temperature loading, and/or thermal management of an exhaust system-associated component of an internal combustion engine, the injection valve is embodied, for example, in the form of a spring-loaded valve.

In another embodiment according to the invention, the injection valve is preceded by a safety valve that shuts off the fuel supply. This safety valve is correspondingly situated upstream of the injection valve and, in certain situations, for example if the vehicle is in an accident, performs the task of shutting off the fuel supply so as to prevent an uncontrolled escape of fuel into the exhaust system.

It is also advantageous if the injection valve is preceded by a metering valve that determines the fuel quantity. By opening and permitting the fuel injection into the exhaust system, the metering valve situated upstream of the injection valve determines time segments during which the regeneration of the particulate filter should be carried out. Furthermore, the fuel quantity respectively introduced by the injection valve can also be determined by means of the metering valve performing its metering function. This can occur in a controlling fashion or also in a regulating fashion and can depend on the respective operating state of the motor vehicle. In this context, it is possible to introduce fuel into the exhaust system not only to regenerate the particulate filter, but also to carry out other tasks, for example to produce a high temperature in the exhaust system after a cold start in order to very quickly achieve the functionality of the catalytic converter, which requires a certain operating temperature for its function.

In another embodiment of the device according to the invention, the injection valve, the safety valve, and the pressure control valve are situated in a low-pressure circuit of a fuel injection system of the internal combustion engine.

The exhaust system-associated component can be a particulate filter for filtering out particulate matter from the exhaust. Alternatively or in addition, it is also possible for the component to be an NOx reservoir. Through the temperature loading of the NOx reservoir by the device according to the invention, it is possible to carry out a desulfurization of the NOx reservoir. In addition or alternatively to the desulfurization, it is also possible to use the device according to the invention to carry out a regeneration of the NOx reservoir. In addition or alternatively it is possible to use the device according to the invention to carry out a tempering, in particular a thermal management, i.e. the temperature situation in the exhaust system can be influenced in a desired fashion.

If the internal combustion engine is embodied in the form of a diesel engine, then the particulate filter is a diesel particulate filter. This prevents the escape of diesel soot into the environment, i.e. reduces the output of fine particulate matter.

Other advantageous modifications and improvements to the device according to the invention for regeneration, temperature loading, and/or thermal management of an exhaust system-associated component of an internal combustion engine; to the injection valve according to the invention; and to the device according to the invention ensue from the description.

Exemplary embodiments of the invention are shown in the drawings and will be explained in greater detail in the description that follows.

DESCRIPTION OF THE PREFERRED EMBODIMENTS

Figure 1:
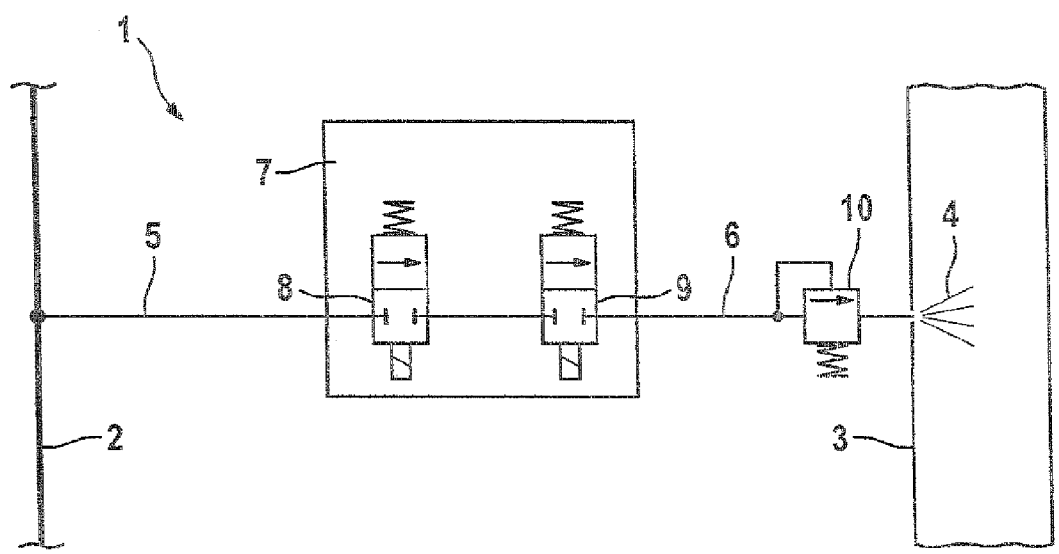
FIG. 1 is a hydraulic block circuit diagram of a device according to the invention for regeneration, temperature loading, and/or thermal management of an exhaust system-associated component of an internal combustion engine of a vehicle.

As is evident from FIG. 1, a device 1 for regeneration, temperature loading, and/or thermal management of an exhaust system-associated component of an internal combustion engine includes an injection valve 10, which injects fuel 4 into an exhaust line 3 of the exhaust system as a function of the pressure of the supplied fuel; a safety valve 8, which is situated upstream of the injection valve 10 and is able to shut off the fuel supply; and a metering valve 9, which is situated between the safety valve 8 and the injection valve 10 and determines the fuel quantity for the injection valve 10. The affected exhaust system-associated component can, for example, be a particulate filter, in particular a diesel particulate filter, or an NOx reservoir.

The safety valve 8, the metering valve 9, and the injection valve 10 are each embodied as a spring-loaded valve; the safety valve 8 and the metering valve 9 are situated in one component 7. The safety valve 8 and the metering valve 9 are preferably embodied as electrically controllable or regulatable and their function can therefore be adapted to the respective driving situation and the existing circumstances. Because of the corresponding spring-loading, the injection valve 10 opens only if a predeterminable operating pressure is exceeded. The supplied fuel must therefore have a certain pressure value.

Figure 2:
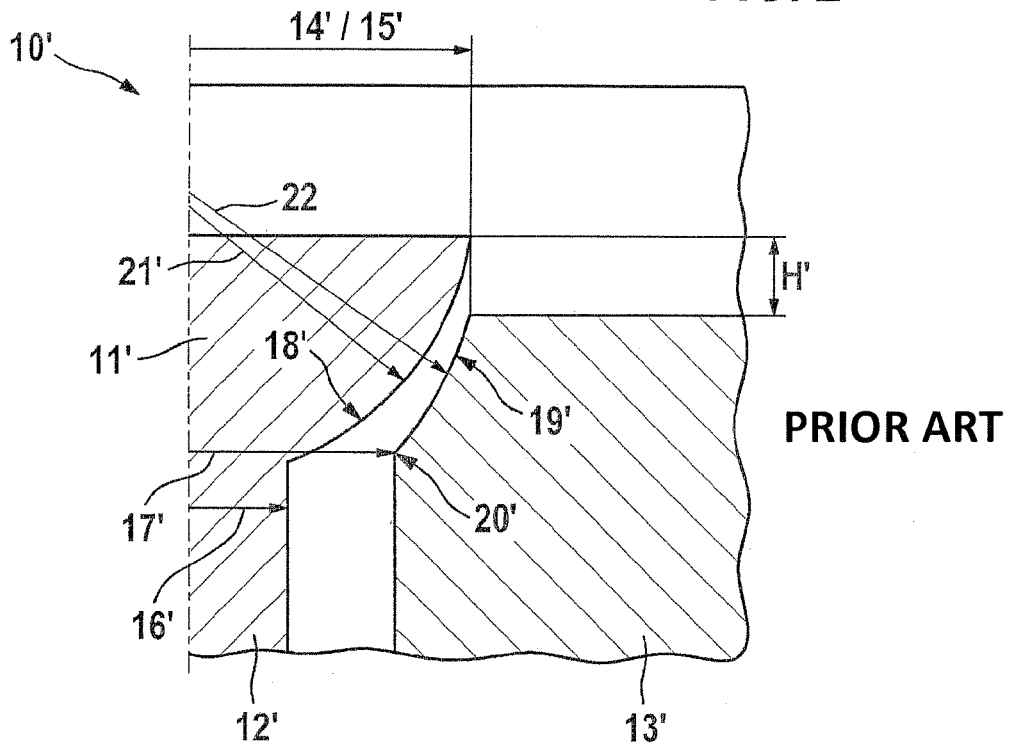
FIG. 2 is a schematic, sectional depiction of a region of an injection valve.

As is evident from FIG. 2, a conventional injection valve 10' includes a valve head 11' with an outer head diameter 14' and an inner head diameter 16'; a valve shaft 12'; and a valve seat 13' with an outer seat diameter 15', which corresponds to the outer head diameter 14', and an inner seat diameter 17'; and is preferably operated in a chattering mode as a function of the pressure of the supplied fuel. Between the inner seat diameter 17' and the outer seat diameter 15', the valve seat 13' has a curved valve seat cut edge 19' with a predetermined valve seat radius 22. As is also evident from FIG. 2, between the inner head diameter 16' and the outer head diameter 14', the valve head 11' has a valve head cut edge 18', which is embodied as a steep, ball-shaped outer curvature with a predetermined valve head radius 21'. This produces a valve sealing edge 20' on the inner seat diameter 15'.

Figure 4:
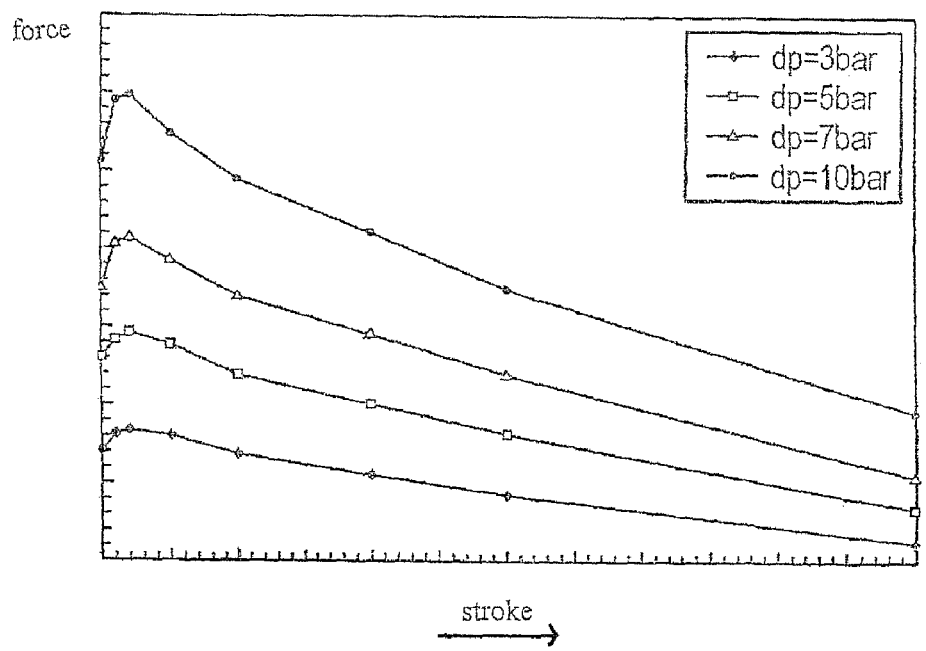
FIG. 4 shows a characteristic curve graph of the injection valve shown in FIG. 2.
Figure 9:
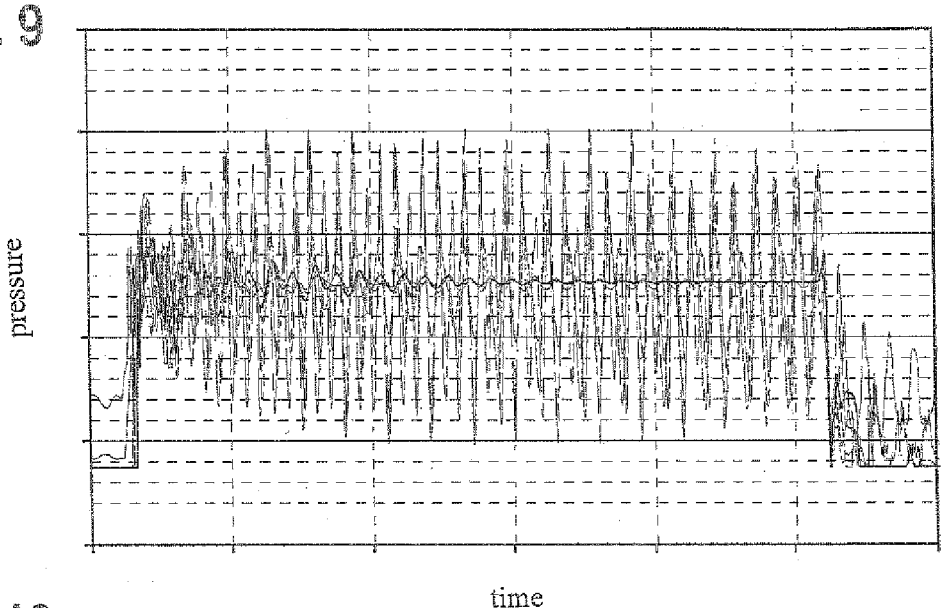
FIGS. 9 through 11 show different characteristic curve graphs of the injection valve shown in FIG. 2.
Figure 10:
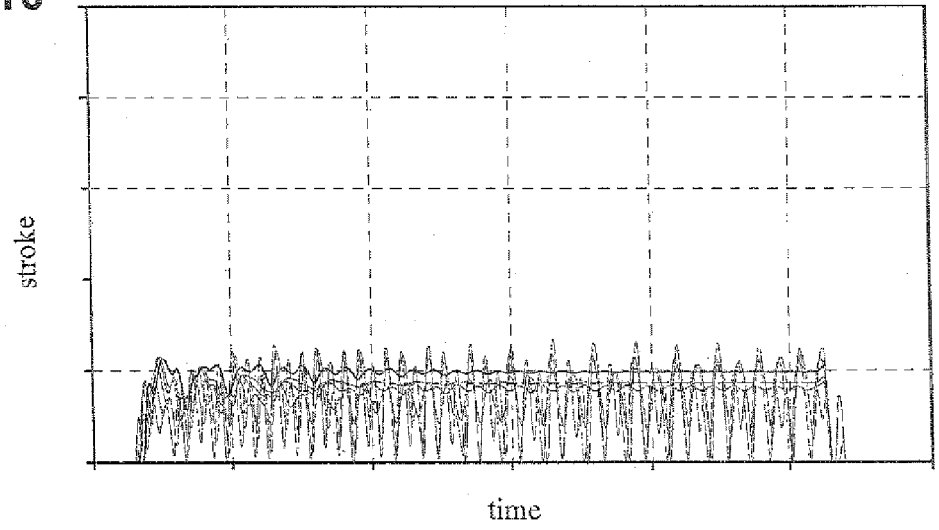
Figure 11:
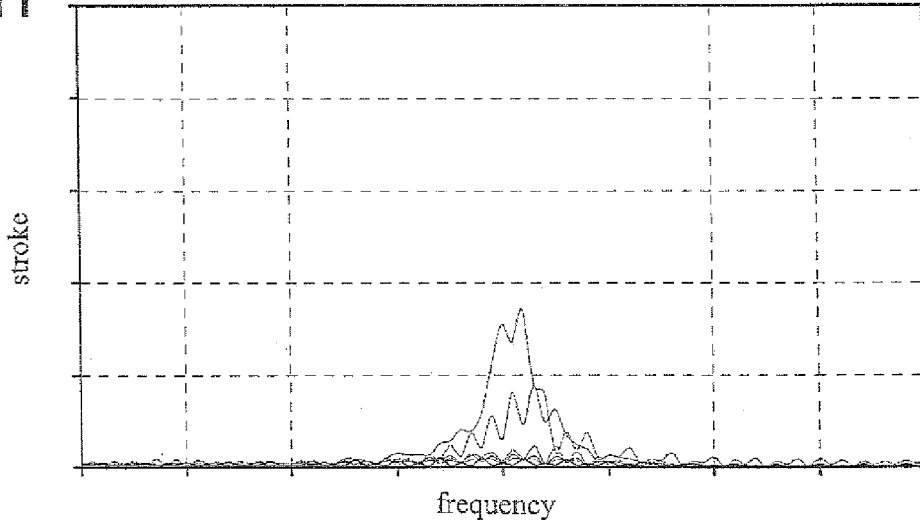

The characteristic curve graph in FIG. 4 shows several characteristic curves for different pressure values of 3 bar, 5 bar, 7 bar, and 10 bar for the flow force over the stroke H. The arrow in FIG. 4 represents the direction of stroke H of the valve head 11. As is evident from the characteristic curve graph in FIG. 4, a flow force of the supplied fuel acting on the conventional injection valve 10' initially rises and then falls as a function of the stroke H of the valve head 11 for all pressure values. The associated characteristic curve graph in FIG. 9 shows several characteristic curves for the pressure over time; the associated characteristic curve graph in FIG. 10 shows several characteristic curves for the stroke H over time, and the associated characteristic curve graph in FIG. 11 shows several characteristic curves for the stroke H over the frequency. As is evident from the characteristic curves in FIGS. 9 through 11, the conventional injection valve 10' produces a robust chattering behavior only in the pressure range from approximately 2.8 bar to 3.8 bar.

Figure 3:
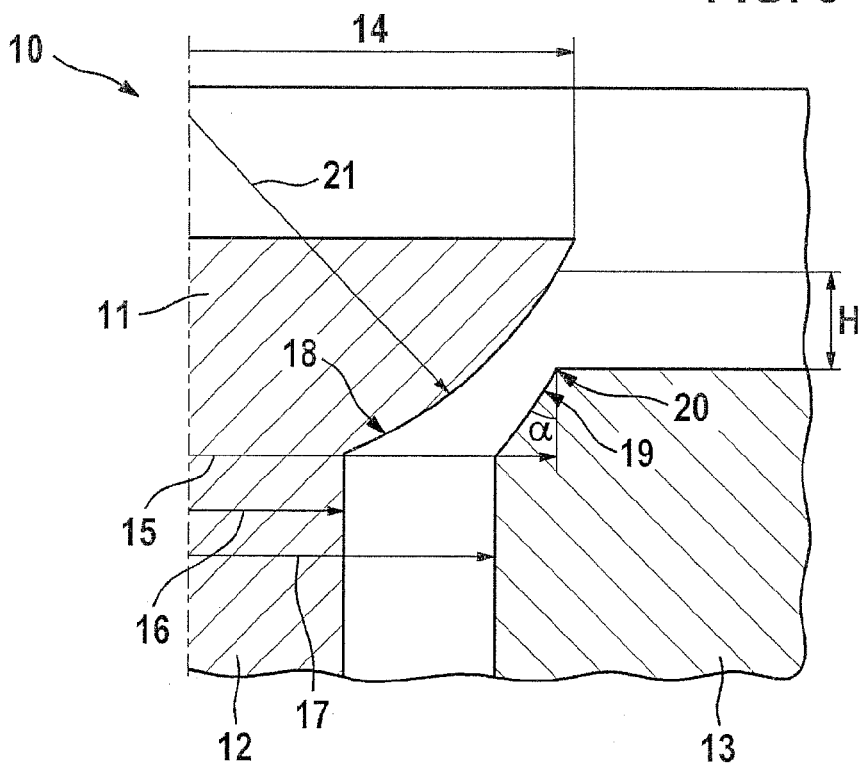
FIG. 3 is a schematic, sectional depiction of a region of a device according to the invention, embodied in the form of an injection valve.

As is evident from FIG. 3, the injection valve 10 according to the invention, analogous to the conventional injection valve 10', includes a valve head 11 with an outer head diameter 14 and an inner head diameter 16; a valve shaft 12; and a valve seat 13 with an outer seat diameter 15 and an inner seat diameter 17; and is preferably operated in the chattering mode as a function of the pressure of the supplied fuel. By contrast with the conventional injection valve 10', the outer head diameter 14 of the injection valve 10 according to the invention is embodied to be larger than the outer seat diameter 15, as a result of which the valve head 11 juts out over the valve seat 13 in the closed state and a valve sealing edge 20 is situated at the outer seat diameter 15. In addition, between the inner seat diameter 17 and the outer seat diameter 15, the valve seat 13 has a straight valve seat cut edge 19 that has a predetermined angle in relation to the vertical. As is also evident from FIG. 3, between the inner head diameter 16 and the outer head diameter 14, the valve head 11 has a valve head cut edge 18 that expands out in the form of a flattened, ball-shaped external curvature, which has a predetermined valve head radius 21.

Figure 5:
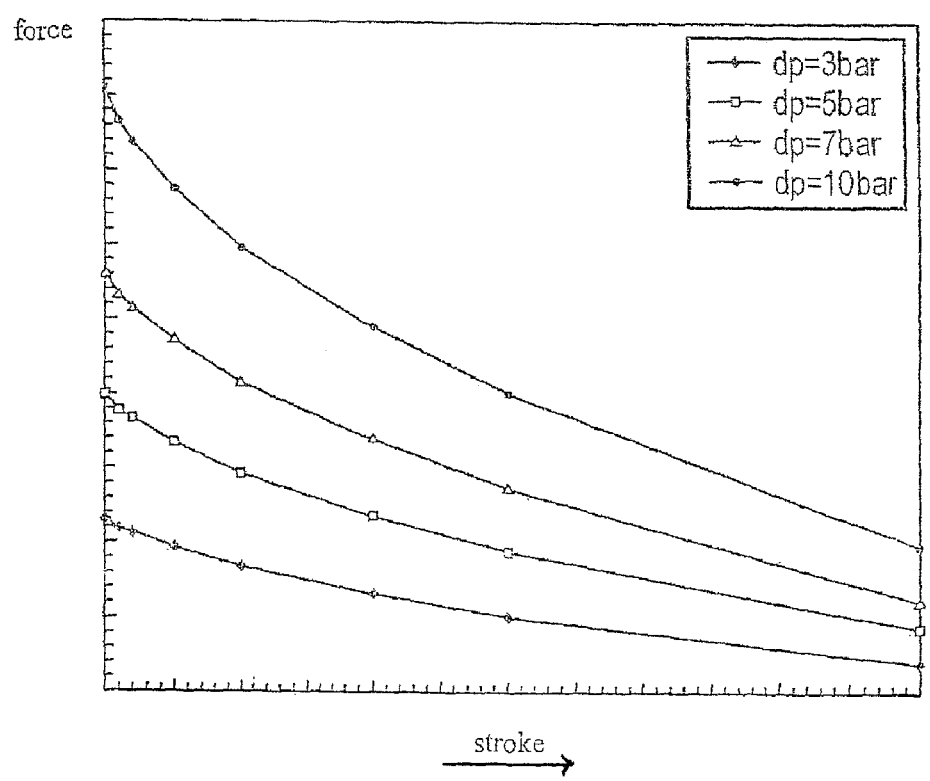
FIG. 5 shows a characteristic curve graph of the injection valve according to the invention shown in FIG. 3.
Figure 6:
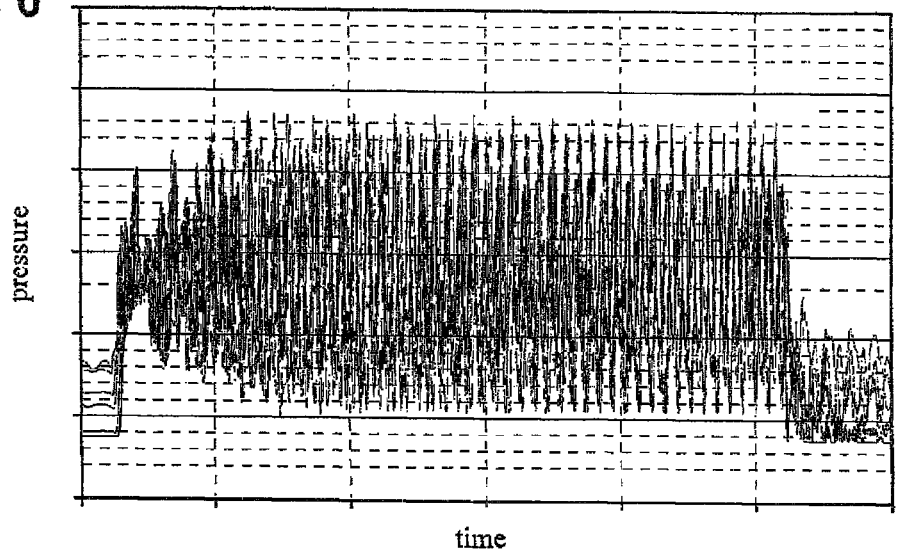
FIGS. 6 through 8 show different characteristic curve graphs of the injection valve according to the invention shown in FIG. 3.
Figure 7:
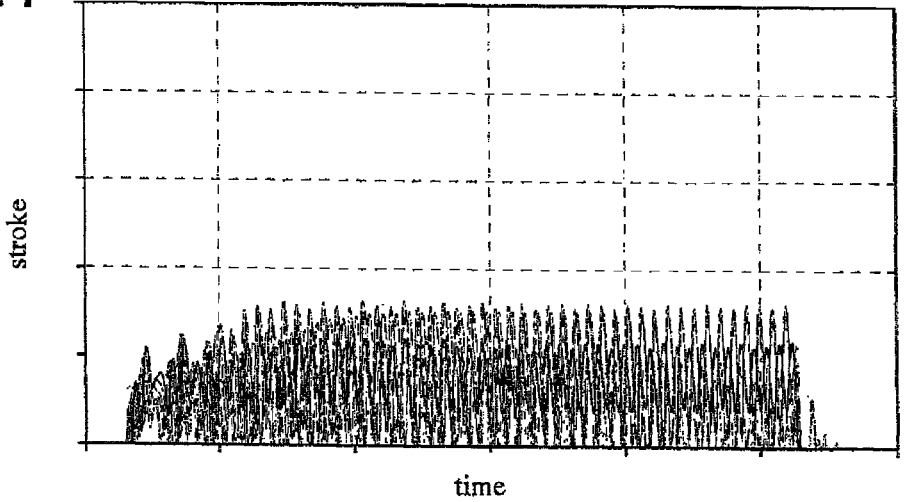
Figure 8:
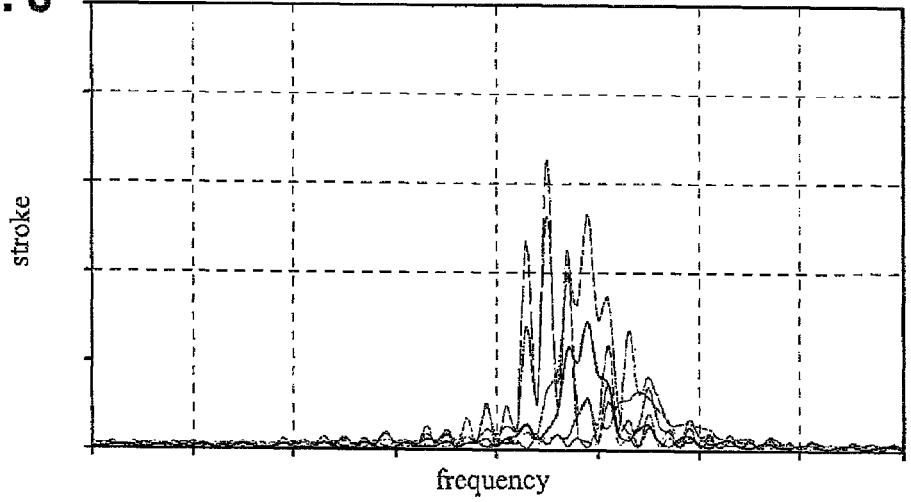

Analogous to the characteristic curve graph in FIG. 4, the characteristic curve graph in FIG. 5 shows several characteristic curves for different pressure values of 3 bar, 5 bar, 7 bar, and 10 bar for the flow force over the stroke H. The arrow in FIG. 5 represents the direction of stroke H of the valve head 11. As is evident from the characteristic curve graph in FIG. 5, the flow force of the supplied fuel acting on the injection valve 10 according to the invention decreases continuously as a function of the stroke H of the valve head 11 for all pressure values so that the pressure range for a robust chattering behavior is advantageously extended, as is evident from the characteristic curve graphs 6 through 8. The associated characteristic curve graph in FIG. 6 shows several characteristic curves for the pressure over time, the associated characteristic curve graph in FIG. 7 shows several characteristic curves for the stroke H over time, and the associated characteristic curve graph in FIG. 8 shows several characteristic curves for the stroke H over the frequency. As is evident from the characteristic curves in FIGS. 6 through 8, the injection valve 10 according to the invention produces a robust chattering behavior for an extended pressure range from approximately 3.0 bar to 4.8 bar.

As is also evident from FIG. 1, the injection valve 10, the safety valve 8, and the metering valve 9 are situated in a low-pressure circuit 2 of a fuel injection system of the internal combustion engine. The low-pressure circuit 2 is supplied by a mechanical fuel delivery pump that is not shown. The fuel delivery pump delivers fuel from the tank of the vehicle and in addition to conveying the fuel, e.g. diesel fuel for a diesel engine, to a high-pressure circuit for injection into the engine, also conveys the fuel to the injection valve 10 via a fuel line 5, the safety valve 8, the metering valve 9, and a fuel line 6. The safety valve 8 is able to shut off the fuel supply in an emergency in order to prevent fuel from escaping or spraying out, for example in the event of an accident. The metering valve 9 can be regulated or controlled so that a desired fuel quantity per unit time is supplied to the injection valve 10 through the fuel line 6. The injection valve 10 is situated so that fuel 4 is injected into the exhaust line 3 of the exhaust system of the internal combustion engine. An oxidizing converter, not shown, is situated downstream of the injection valve 10 in the exhaust system and when fuel is injected, the converter sharply increases the exhaust temperature in the exhaust system so that a particulate filter situated downstream of the oxidation converter in the exhaust system is regenerated. In other words, the temperature increase causes filtered particles, e.g. soot and other fine particulate matter, to combust so that after the regeneration phase, the particulate filter is clean and available for use.

Figure 12:
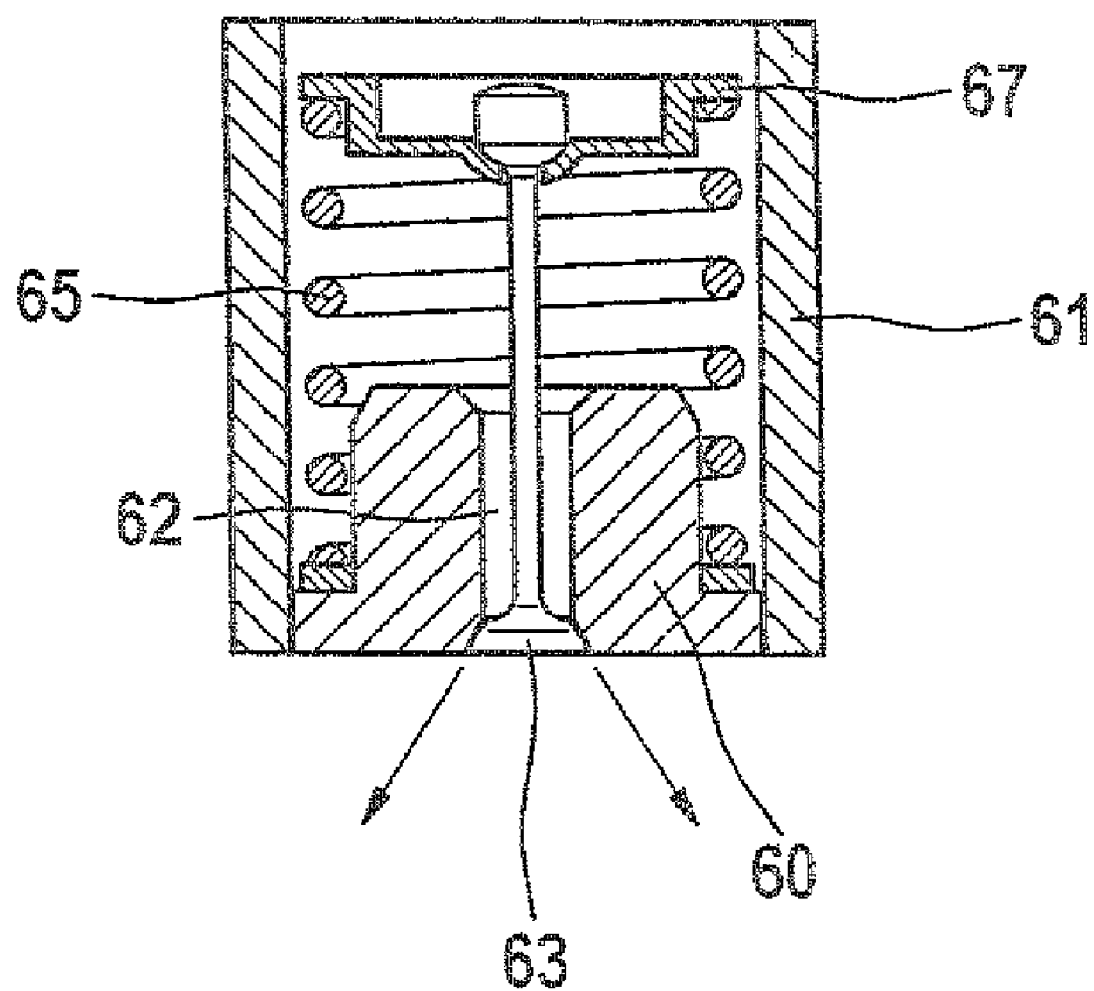
FIG. 12 shows an injection valve.

FIG. 12 is a cross-sectional view of a pressure-controlled injection valve with a tubular valve holder 61, whose valve outlet end has a valve body 60 attached to it. The valve body 60 has a central bore 62. A valve needle 63 with a valve head is situated inside the bore. A spring 65 is clamped between the valve body 60 and a spring retainer 67. The spring retainer is connected to the end of the valve needle oriented away from the valve head so that the spring 65 supported on the valve body 60 presses the valve head of the valve needle against the valve body so that the bore is closed as long as additional forces are not acting on the valve needle.

In this case, the nozzle opens in the outward direction. It opens when the sum of the spring force, friction force, force of gravity of the oscillating system, and force of pressure of the contacting fuel, i.e. the hydraulic force, has a component that is oriented from the spring retainer toward the valve head. In this case, the oscillating arrangement is optimized so that its needle executes a stable longitudinal oscillation during the metering of the fuel. In the closed state, the spring presses the outward-opening needle into the seat. Through the selective matching of the flow force, pressure force, and spring force, the needle executes the required stable oscillating motion around an average value during the metering. This oscillating state, the so-called chattering, is in particular achieved by means of the selective matching of the flow force and spring force. In this case, the flow force is selectively influenced through the above-mentioned selection of the outer head diameter in relation to the outer seat diameter of the valve seat. Adhering soot is "shaken off" by the periodic, stable longitudinal acceleration of the nozzle needle occurring during metering, in connection with the resulting change in the flow conditions.

Figure 13:
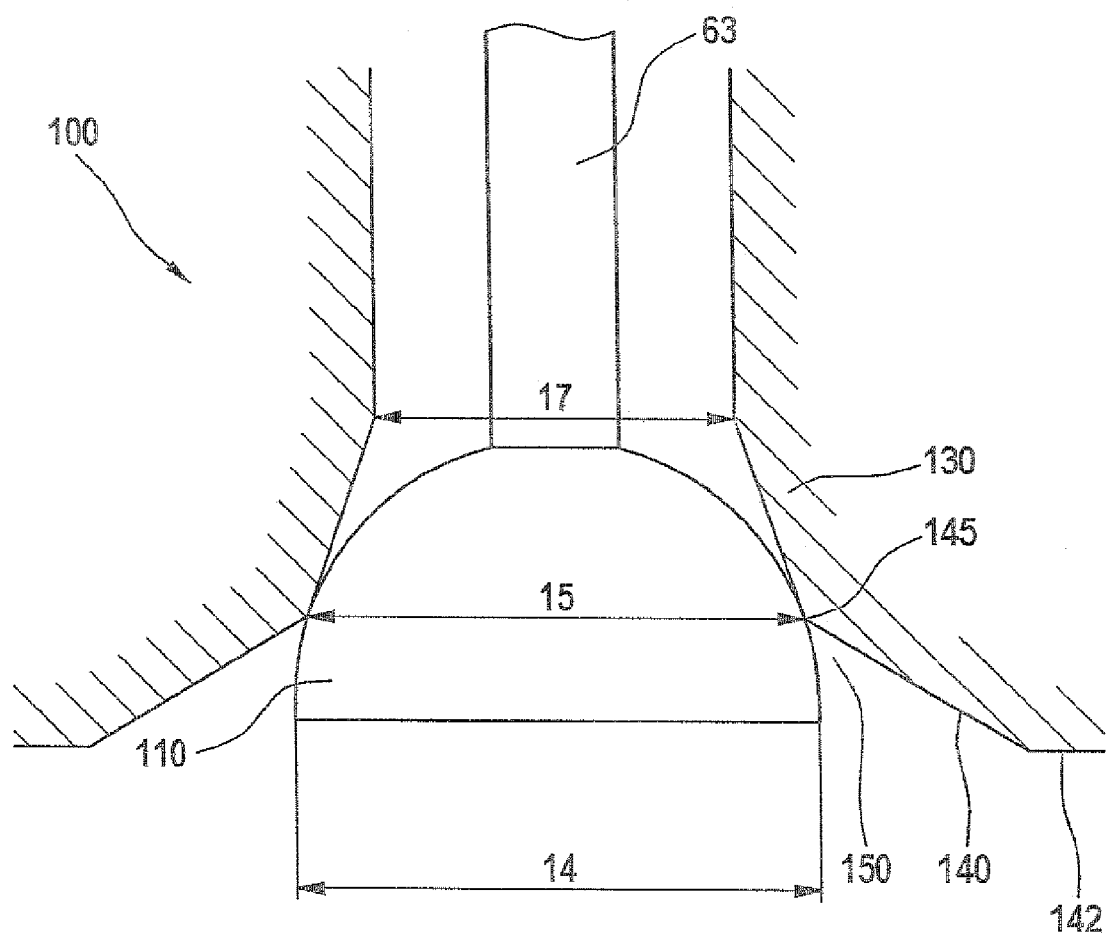
FIG. 13 is another schematic, local sectional depiction of an injection valve.

FIG. 13 shows another injection valve 100 according to the invention with a valve head 110 whose outer head diameter 14, analogous to the arrangement shown in FIG. 3, is greater than the outer seat diameter 15. Analogous to the arrangement shown in FIG. 3, the nozzle needle also serves as a shield that protects the valve seat 130 and the valve sealing edge 145 from deposits of particles. By contrast with the arrangement in FIG. 3, the valve sealing edge 145 is slightly recessed in relation to the outer edge region 142 of the valve and in relation to a housing of the valve so that soot particles contained in the exhaust do not directly strike the sensitive region of the valve sealing edge 145, which is consequently situated in the lee of an inclined region 140 and in a niche 150 formed by the inclined region. The preferred longitudinal position of the valve sealing edge is situated as far as possible toward the outside, i.e. away from the inner seat diameter 17 toward the outer seat diameter 15 or on the outer seat diameter 15, as shown in FIG. 13, thus preventing soot particles from penetrating into the inner region of the valve seat 130.

The injection valve 10 or 100 according to the invention can be used in all known injection systems, independent of their design, for example also in valve arrangements with needles that are triggered magnetically or by means of a piezoelectric actuator, in particular with directly triggered needles, thus yielding a correspondingly broad application range. The injection valve according to the invention is preferably connected to the respective low-pressure circuit 2. The chattering operation of the injection valve 10 according to the invention, which is possible in the expanded pressure region, makes it possible to achieve a very good atomization of the fuel 4 in the exhaust line 3 so that the diesel fuel can completely vaporize in the exhaust line.

Figure 14:
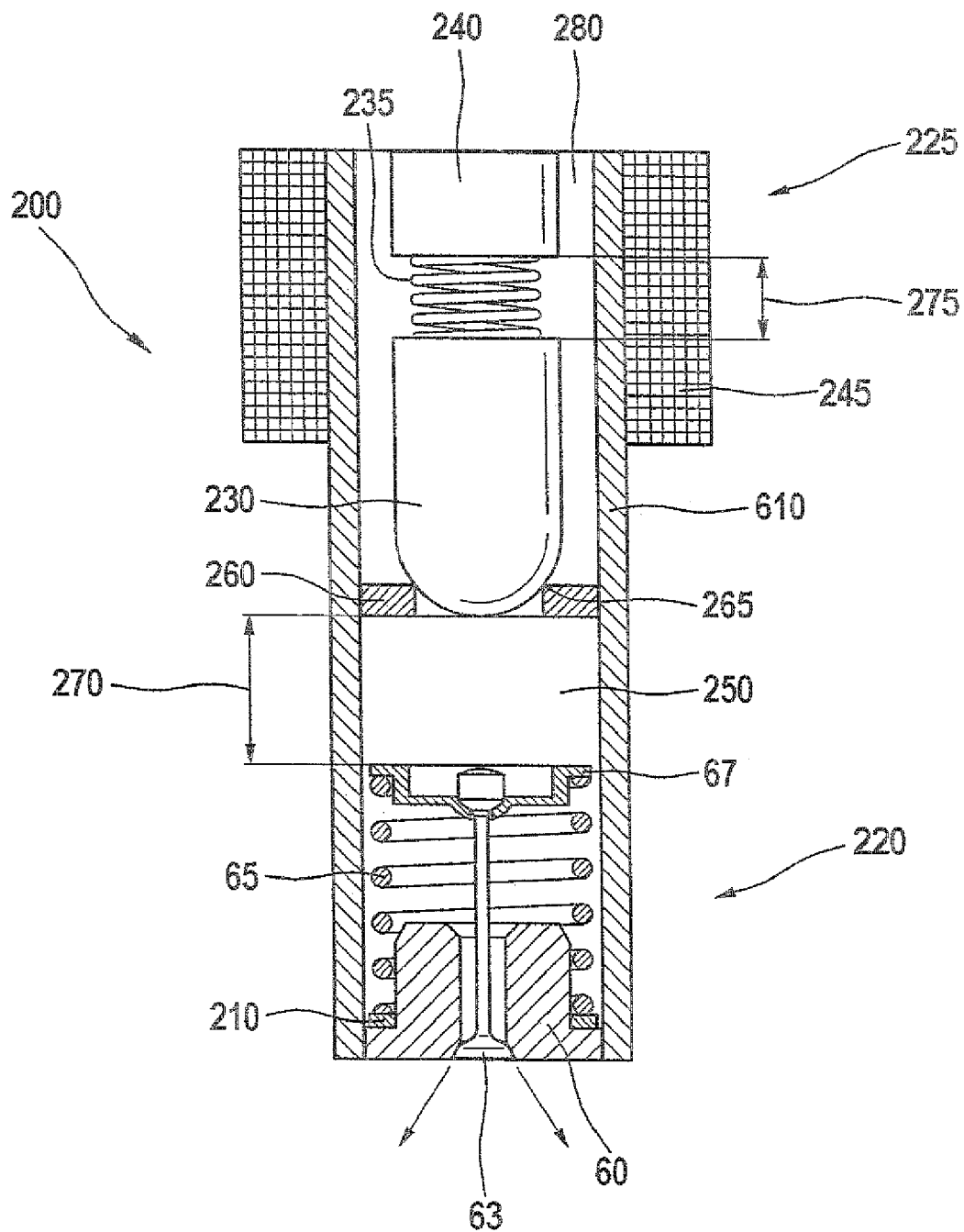
FIG. 14 shows an injection valve with an integrated metering valve.

FIG. 14 shows a cross-sectional view of another alternative embodiment of the injection valve according to the invention, embodied in the form of a combination valve 200, which has a first, pressure-controlled valve 220 and a second magnet-controlled valve 225. Both valves are integrated into an in particular tubular valve holder 610. The components 60, 63, 65, and 67 correspond to the embodiment in FIG. 12; the valve head can be alternatively embodied as recessed in accordance with FIG. 13 or protruding in accordance with FIG. 3; the spring 65 is preferably composed of Iconel, a nickel-based alloy, or a similar high-temperature-resistant material. Situated between the spring 65 and the valve body 60, the first valve 220 has a washer 210 for adjusting the stroke H (see FIG. 3) of the spring 65 and the outward-opening valve needle 63. This adjustment is made a single time, when the valve 200 is manufactured. Alternatively, the valve body 60 can also be embodied as reversibly attachable, for example so that it can be screwed into the valve holder 61;

this permits the washer to be replaced with a washer of a different thickness in the event of maintenance or repair. The second magnet-controlled valve 225, which performs the metering function, is situated upstream of the first valve 220, viewed in the flow direction of the fluid, reducing agent, or fuel to be metered. This second valve has the second valve needle 230 that a second spring 235, which is clamped between the valve needle 230 and a stroke stop 240, presses against the valve sealing edge 265 of the second valve body 260 integrated into the valve holder 610. The maximum stroke of the second valve needle is determined by the stroke height 275 resulting from the distance between the opposing sides of the stroke stop 240 and the second valve needle 230. The second valve needle 230 is composed of magnetic, in particular ferromagnetic, material and is lifted in opposition to the force of the second spring 235 by means of a switchable magnetic field of the magnetic coil 245 situated on the valve holder 610 so that the fluid to be metered can pass through the chamber 280 between the valve holder 610 and the valve needle 230, through the region of the valve sealing edge 265. In this way, the fluid travels into a resonance volume 250, which is situated between the second valve and the first valve and is formed by the spacing between the two valves by the height 270 in the valve holder 610.

In the closed state, the spring 65 presses the valve head of the outward-opening needle 63 with a definite force into the seat formed by the valve body 60. In order to meter fuel, the solenoid valve is activated so that the supply pressure present in the chamber 280 acts on the seat and causes the needle 63 to open. Through the selective matching of the flow force, pressure force, and spring force of the resonance volume 250 between the two valves and through the design of the resonance element, which mainly includes the valve needle 63, the spring 65, the resonance volume 250, and the (fuel) volume in the region of the spring 65, the needle 63 executes the required stable oscillation movement around an average position during the metering. The frequency of this oscillation is between 100 and 10,000 Hz. The triggering of the solenoid valve is carried out, for example, in a frequency-modulated and/or pulse-width-modulated fashion as a function of the required metering quantity of fluid, for example fuel or other liquids. The injector principal according to FIG. 14 features an integration of the spray preparation and metering function into a single component whose function is not impaired by soot present in the exhaust. The combination valve 200 is a consolidation of an outward-opening, pressure-controlled nozzle and a solenoid valve situated upstream of it so that a definite volume is produced between the two valves. This definite volume serves as a resonance element for pressure waves so that the nozzle needle 63, together with the spring retainer 67 and the spring 65, executes a stable longitudinal oscillation by design during the metering. This oscillation state, the so-called chattering, is achieved through the selective matching of the flow force and spring force. In this case, the geometry of both the valve head of the valve needle 63 and the associated valve seat (see valve seat 130 in FIG. 13 and valve seat 13 in FIG. 3) is embodied so that a flow force of the supplied fuel acting on the first valve 220 continuously decreases over the stroke of the valve head. The combination of two valve principles yields a coking-resistant valve that can simultaneously also be used for the precise metering of filet into the exhaust. The metering tolerances can be reduced in comparison to the use of two separate valves. On the one hand, the defined resonance volume 250 provides defined conditions for assuring the chattering operation on the other hand, the metering precision is higher because of the definite, small volume between the two valves and, by contrast with the arrangements according to FIG. 3 or FIG. 13, no additional, separate metering valve is required for selectively controlling the metering quantity.

Optionally, the second valve 225 can also be embodied in the form of a valve that is piezoelectrically triggered or can be switched in some other way.

The triggering of the injection valve (10, 100, 200) occurs in a cyclical or pulse-width-modulated fashion. In this case, the injection valve preferably functions in chattering mode during a time segment in which the injection valve is triggered to open. The chattering operation is preferably composed of the valve head of the injection valve oscillating around an average position, essentially without coming into contact with a valve seat that interacts with the valve head in the closed state of the injection valve. The oscillation frequency of the valve head and valve needle associated with the chattering operation in this case preferably lies in a range between 100 and 10,000 Hz.

The device according to the invention for regeneration, temperature loading, and/or thermal management of an exhaust system-associated component of an internal combustion engine includes at least one injection valve or is embodied in the form of an injection valve. The treatment of the exhaust preferably takes place downstream of the engine, i.e. the fluid, in particular the fuel, is supplied to the exhaust after it has left the engine.

The foregoing relates to the preferred exemplary embodiments of the invention, it being understood that other variants and embodiments thereof are possible within the spirit and scope of the invention, the latter being defined by the appended claims.

The invention claimed is:

1. A device for regeneration, temperature loading, and/or thermal management of a component associated with an exhaust system of an internal combustion engine, the device comprising:

at least one injection valve which injects fluid into the exhaust system in a chattering mode as a function of a pressure of supplied fluid for the regeneration, temperature loading, and/or thermal management of the component, wherein the at least one injection valve has a valve head and a valve seat, and wherein the valve head has a valve head cut edge that expands from an inner head diameter to an outer head diameter with a flattened ball-shaped external curvature, which has a predetermined valve head radius, and the valve seat, between an inner seat diameter and an outer seat diameter, has a straight valve seat cut edge that has a predetermined angle in relation to a vertical, so that a flow force of the supplied fluid acting on the at least one injection valve decreases continuously over a stroke of the valve head to enlarge a pressure range of the chattering mode.

2. The device as recited in claim 1, wherein the outer head diameter of the valve head is larger than the outer seat diameter of the valve seat, and the valve head juts out over a valve sealing edge of the valve seat in a closed position.

3. The device as recited in claim 1, wherein the valve head is recessed relative to an edge region of the at least one injection valve in at least a closed state of the at least one injection valve.

4. The device as recited in claim 3, wherein the edge region is connected to the valve seat by an inclined region so that a niche delimited by the inclined region and the valve head is formed between the valve head and the edge region.

5. The device as recited in claim 2, wherein the valve sealing edge of the valve seat is situated at the outer seat diameter of the valve seat.

6. The device as recited in claim 2, wherein on a side of the outer seat diameter of the valve seat, between the valve seat and an edge region or at the edge region of the valve, an inclined region is provided so that the valve head is able to move inside a niche laterally delimited by the inclined region and is recessed in relation to the edge region in at least a closed state of the valve.

7. The device as recited in claim 1, wherein the at least one injection valve is embodied in the form of a spring-loaded valve.

8. The device as recited in claim 1, further comprising a safety valve that shuts off fluid supply, and wherein the at least one injection valve is preceded in a fluid line by the safety valve.

9. The device as recited in claim 1, further comprising a metering valve that determines fluid quantity, and wherein the at least one injection valve is preceded in a fluid line by the metering valve.

10. The device as recited in claim 1, wherein an additional valve that functions as a metering valve is integrated into the at least one injection valve.

11. The device as recited in claim 10, wherein the metering valve is situated upstream of the valve head and the valve seat.

12. The device as recited in claim 11, wherein the metering valve is connected by a valve holder to a valve body that includes the valve seat.

13. The device as recited in claim 12, wherein the valve holder delimits a resonance volume between the metering valve and the valve body.

14. The device as recited in claim 8, further comprising a metering valve that determines fluid quantity to the at least one injection valve, and wherein the at least one injection valve is preceded in a fluid line by the metering valve, and the safety valve and the metering valve are situated in a low-pressure circuit of a fuel injection system of the internal combustion engine.

15. The device as recited in claim 1, wherein the component is a particulate filter or an NOx reservoir.

16. An injection valve for use in a device for regeneration, temperature loading, and/or thermal management of an exhaust system-associated component of an internal combustion engine, the injection valve injecting a fluid into the exhaust system in a chattering mode as a function of a pressure of supplied fluid, the injection valve comprising a valve head and a valve seat, the valve head having a valve head cut edge that expands from an inner head diameter to an outer head diameter with a flattened ball-shaped external curvature, which has a predetermined valve head radius, and the valve seat, between an inner seat diameter and an outer seat diameter, having a straight valve seat cut edge that has a predetermined angle in relation to a vertical so that a flow force of supplied fluid acting on the injection valve decreases continuously over a stroke of the valve head to enlarge a pressure range of the chattering mode.

17. A method for regeneration, temperature loading, and/or thermal management of an exhaust system-associated component of an internal combustion engine, comprising the steps of:
   providing at least one injection valve which injects fluid into the exhaust system in a chattering mode as a function of a pressure of supplied fluid, and
   forming the at least one injection valve with a valve head having a valve head cut edge that expands from an inner head diameter to an outer head diameter with a flattened ball-shaped external curvature, which has a predetermined valve head radius and a valve seat, between an inner seat diameter and an outer seat diameter, having a straight valve seat cut edge that has a predetermined angle in relation to a vertical, so that a flow force of the supplied fluid acting on the at least one injection valve decreases continuously over a stroke of the valve head to enlarge a pressure range of the chattering mode.

18. The device as recited in claim 1, wherein the enlarged pressure range of the chattering mode is from approximately 3.0 bar to 4.8 bar.

* * * * *

UNITED STATES PATENT AND TRADEMARK OFFICE
CERTIFICATE OF CORRECTION

PATENT NO. : 8,371,107 B2  Page 1 of 1
APPLICATION NO. : 12/301398
DATED : February 12, 2013
INVENTOR(S) : Haeberer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this
First Day of September, 2015

Michelle K. Lee
*Director of the United States Patent and Trademark Office*